United States Patent
Heller et al.

(10) Patent No.: US 9,352,507 B2
(45) Date of Patent: May 31, 2016

(54) SEPARATOR DEVICE FOR PREFORMS

(71) Applicant: KHS CORPOPLAST GMBH, Hamburg (DE)

(72) Inventors: Alexander Heller, Bargteheide (DE); Dieter Holler, Rümpel (DE)

(73) Assignee: KHS CORPOPLAST GMBH, Hamburg (DE)

( * ) Notice: Subject to any disclaimer, the term of this patent is extended or adjusted under 35 U.S.C. 154(b) by 0 days.

(21) Appl. No.: 14/425,463

(22) PCT Filed: Sep. 9, 2013

(86) PCT No.: PCT/EP2013/002695
§ 371 (c)(1),
(2) Date: Mar. 3, 2015

(87) PCT Pub. No.: WO2014/037120
PCT Pub. Date: Mar. 13, 2014

(65) Prior Publication Data
US 2015/0258727 A1      Sep. 17, 2015

(30) Foreign Application Priority Data
Sep. 7, 2012    (DE) .......................... 10 2012 017 699

(51) Int. Cl.
*B65G 47/14*      (2006.01)
*B07C 5/02*       (2006.01)
(Continued)

(52) U.S. Cl.
CPC ............ *B29C 49/4205* (2013.01); *B65G 47/24* (2013.01); *B65G 47/256* (2013.01); *B29C 49/06* (2013.01); *B29C 2049/024* (2013.01); *B29C 2049/4226* (2013.01); *B29C 2049/4231* (2013.01)

(58) Field of Classification Search
CPC .................................. B65G 47/14; B07C 5/02
USPC ........................... 198/373, 389; 209/522, 707
See application file for complete search history.

(56) References Cited

U.S. PATENT DOCUMENTS

| 3,532,202 A | 10/1970 | Ochs |
| 4,076,071 A | 2/1978 | Rosenkranz et al. |

(Continued)

FOREIGN PATENT DOCUMENTS

| DE | 1912687 A1 | 2/1970 |
| DE | 2352926 A1 | 4/1975 |

(Continued)

*Primary Examiner* — Douglas Hess
(74) *Attorney, Agent, or Firm* — Lucas & Mercanti, LLP; Klaus P. Stoffel

(57) ABSTRACT

A separator device for preforms with an alignment device for handling incorrectly aligned preforms, wherein the separator device is a roller sorter with two transport rollers rotating in opposite directions to one another, between which rollers preforms are transported in a conveying direction, in a suspended manner and with an intended alignment. The alignment device has a rotating body mounted rotatably about an axis, which body is arranged above the roller sorter so that the rotating body projects into the movement path of incorrectly aligned preforms. The rotating body is designed to exert an alignment force on incorrectly aligned preforms. The rotating body also projects into the movement path of the preforms with the intended alignment and is therefore designed and arranged to exert an alignment force only on incorrectly aligned preforms.

11 Claims, 6 Drawing Sheets

(51) Int. Cl.
*B29C 49/42* (2006.01)
*B65G 47/256* (2006.01)
*B65G 47/24* (2006.01)
*B29C 49/06* (2006.01)
*B29C 49/02* (2006.01)

(56) References Cited

U.S. PATENT DOCUMENTS

| | | | | |
|---|---|---|---|---|
| 4,653,628 A * | 3/1987 | Claypool | ............. | B65G 47/244 198/394 |
| 5,346,386 A | 9/1994 | Albrecht et al. | | |
| 5,648,026 A | 7/1997 | Weiss | | |
| 6,575,305 B1 * | 6/2003 | Casagrande | ......... | B07C 5/3404 198/455 |
| 6,968,936 B2 | 11/2005 | Charpentier | | |
| 7,150,349 B2 * | 12/2006 | Meynieux | .......... | B65G 47/1478 198/396 |
| 7,337,893 B2 * | 3/2008 | Charpentier | ......... | B65G 47/256 198/398 |
| 7,506,748 B2 * | 3/2009 | Pugh | .................... | B65G 47/082 198/396 |
| 7,556,137 B2 * | 7/2009 | Charpentier | .............. | B07C 5/02 198/369.7 |
| 7,861,845 B1 * | 1/2011 | Lapointe | ................ | B65G 33/06 198/383 |
| 8,337,193 B2 * | 12/2012 | Brown | ................ | B29C 49/4205 198/389 |
| 8,490,797 B2 | 7/2013 | Tanner | | |
| 8,522,956 B2 * | 9/2013 | Tanner | ................ | B29C 49/4205 198/395 |
| 8,813,944 B2 | 8/2014 | Tanner | | |

FOREIGN PATENT DOCUMENTS

| | | |
|---|---|---|
| DE | 4212683 A1 | 10/1993 |
| DE | 102011016858 A1 | 10/1993 |
| DE | 4340291 A1 | 6/1995 |
| DE | 60118772 T2 | 5/2007 |
| EP | 2065320 A1 | 6/2009 |
| EP | 2554356 A1 | 2/2013 |
| WO | 2010006461 A1 | 1/2010 |
| WO | 2011069268 A1 | 6/2011 |

* cited by examiner

SEPARATOR DEVICE FOR PREFORMS

The present application is a 371 of International application PCT/EP2013/002695, filed Sep. 9, 2013, which claims priority of DE 10 2012 017 699.6, filed Sep. 7, 2012, the priority of these applications is hereby claimed and these applications are incorporated herein by reference.

BACKGROUND OF THE INVENTION

In container molding by the action of a blowing pressure, preforms of thermoplastic material such a preforms of PET (polyethylene terephthalate) are sent through various processing stations within the blow-molding machine. A blow-molding machine of this type typically comprises a heating device for thermally conditioning the preforms and a blowing device, in the area of which the previously tempered preform is expanded by biaxial orientation to form a container. The expansion takes place with the help of compressed air, which is introduced into the preform to be expanded. The sequence of processing steps carried out during this expansion of the preform is explained in DE-OS 43 40 291. The basic configuration of a blow-molding station for forming containers is described in DE-OS 42 12 583. Possible ways of tempering the preforms are explained in DE-OS 23 52 926. Reference is herewith made to the content of these documents.

The blow-molding machine must be supplied continuously with preforms so that the feed to the blow-molding machine will not be interrupted. This is true both for linear blow-molding machines and for those based on the rotary wheel principle. There are two alternative ways in which the preforms can be sent to the blow-molding machine. In the case of the so-called "one-step" method, the preforms are produced by an injection-molding process, and, immediately after they have been injection-molded (and after they have solidified sufficiently), they are transported directly to the blow-molding machine by a conveying apparatus. In the case of the so-called "two-step" method, the preforms are first produced by an injection-molding process and then stored; they are conditioned with respect to their temperature and then blown into containers only at a later time. The production of the preforms and the blow-molding of the preforms into containers can thus take place at different times and at different places.

The two methods have in common that the preforms are sent to the blow-molding machine by a conveying apparatus. Known apparatuses consist of, for example, a vertical conveyor, by which the preforms, which are stored in a collecting bin, are transported to a conveying device. By means of the conveying device, usually a conveyor belt, the preforms are transported to separator device. This separator device has the task of orienting the preforms so that they assume a defined position and of separating them from each other so that they can be transferred properly to, for example, a downstream blow-molding machine. Known separator devices (so-called "roller sorters") consist of, for example, two conveying rollers, which rotate around their axes in opposite directions and between which a narrow gap remains, which is selected so that the preforms can be held, suspended by their collars, between the rotating conveying rollers. The conveying rollers are arranged with a gradient, that is, at a certain angle to the horizontal, so that the preforms slide along the conveying rollers in the direction of the gradient. In this way, the preforms are sorted in suspended fashion, separated from each other between the rotating rollers, and also conveyed as a result of the gradient.

It is known that it is possible to sort out preforms which have not been properly sorted and which are lying horizontally on, and in alignment with, the conveying rollers instead of being suspended from the conveying rollers. Such sorting-out devices are known from, for example, WO2011/069268 A1. There the sorting-out is realized by the action of a blast of air directed at the misaligned preforms. In this document, additional sorting-out devices according to the prior art are also discussed.

It is also known that rotating wheels can be used to accomplish the sorting-out task; these are also called "kicker wheels". Kicker wheels are known which are arranged to work in a backflow manner. The rotational axis of such wheels is parallel to, and a certain distance above, the plane defined by the two rotational axes of the conveying rollers of the roller sorter. The rotational direction is selected so that the rotating paddles of the wheel move in the direction opposite to that in which the preforms are being conveyed. A preform which projects above the predefined height is gripped by a paddle of the paddle wheel, pulled out in the direction opposite the conveying direction and opposite the oncoming preforms, and ejected. It is considered a disadvantage that this results in the creation of large gaps in the flow of preforms.

An alternative configuration is described in DE 601 18 772 T2, which shows a kicker wheel arranged above the conveying rollers of a roller sorter. In a first example, the rotational axis of the kicker wheel is parallel to, and a certain distance above, the plane defined by the two rotational axes of the conveying rollers of the roller sorter, wherein the rotational axis is at an angle to its conveying direction. When a preform is gripped, the angled position has the effect of ejecting the preform both to the side and in the backflow direction simultaneously. It is still considered a disadvantage, however, that in this way gaps are formed in the flow of preforms.

In the second example described in DE 601 18 772 T2, the rotational axis of the kicker wheel is parallel to, and a certain distance above, the plane defined by the two rotational axes of the conveying rollers of the roller sorter, wherein the rotational axis is now parallel to the conveying direction. When a preform is gripped, only a sideways-acting ejection force is applied. In this configuration, it is considered disadvantageous that the paddles of the kicker wheel can dip to only a small degree between the conveying rollers and that it is impossible to adjust the height of the wheel.

It is also known from the prior art that the preforms suspended between the conveying rollers can be observed by a sensor system or a camera system, that misaligned preforms can thus be recognized, and that these misaligned preforms can then be ejected by a blast of air and/or by mechanical ejectors.

All of the configurations described above also suffer from the disadvantage that misaligned preforms are sorted out of the flow of preforms, as a result of which the throughput of the preforms can be considerably reduced, especially in the case of high-performance machines.

SUMMARY OF THE INVENTION

It is therefore the goal of the present invention to offer a remedy here. The improved separator for preforms comprises for this purpose an alignment device for dealing with misaligned preforms, i.e., a device which corrects the position of a misaligned preform by changing it to a suspended orientation, so that the separator is adapted in particular to the high throughputs required for supplying a high-performance blow-molding machine with preforms.

For the treatment of misaligned preforms, the separator device according to the invention comprises an alignment device, wherein the separator device is configured as a roller sorter with two conveying rollers rotating in opposite directions, between which the preforms are transported in a conveying direction while properly suspended with the intended orientation. The alignment device comprises a rotating body supported rotatably around an axis, which is arranged above the roller sorter in such a way that the rotating body projects into the path along which misaligned preforms move, wherein the rotating body is configured to exert an aligning force on misaligned preforms. In contrast to the prior art, the rotating body also projects into the path along which the properly aligned preforms are moving. It is configured in such a way that it exerts an orienting force on misaligned preforms, whereas correctly aligned preforms are left alone and remain properly aligned.

The present invention offers the advantage that, by means of a suitable arrangement of a rotating body, a misaligned preform can be easily aligned properly without causing any interference with the course of movement of the preforms by the rotating body. The rotating body acts with its alignment-correcting effect only on misaligned preforms.

The type of rotating body can be freely selected over a wide range. It would be conceivable, for example, for the rotating body to engage from below in the path of movement of the preforms. It is preferable, however, that it engage from above. According to another advantageous embodiment of the invention, the rotating body has a star-shaped configuration with fingers projecting radially outward into the path of the preforms. As a result of the star-shaped configuration, it is possible to exert the aligning force on the misaligned preforms in an advantageous manner. It is especially advantageous for this force to be exerted from above.

According to another advantageous embodiment of the invention, the fingers are spaced a certain distance apart, preferably with an equidistant spacing, around the circumference of the rotating body, wherein the distance between adjacent fingers at the outer circumference is preferably essentially equal to the distance between the centers of two abutting preforms suspended from the conveying rollers in the intended direction. This embodiment offers the advantage that each preform is thus certain to engage with the fingers. It would also be possible, however, for the fingers to be arranged closer together, so that in some cases they fit between adjacent preforms or so that more than one of them acts on an individual preform.

According to another embodiment of the invention, it is advantageous for the rotating body to be arranged in such a way that the rotating body engages centrally between the two conveying rollers in the path of movement of the preforms. As a result, it can project far enough to extend between the conveying rollers and, if necessary, it can extend to a point underneath the plane where the preform collars rest on the rollers.

According to another advantageous embodiment of the invention, the rotational axis of the rotating body is parallel to the plane defined by the rotational axes of the conveying rollers. It is also advantageous for the rotational axis of the rotating body to be essentially perpendicular to the conveying direction of the preforms, and for the rotational direction of the rotating body to correspond to the conveying direction. The direction in which the fingers move upon engagement in the flow of preforms is then the same as the direction in which the preforms are moving. Backups are therefore avoided.

According to the invention, the alignment device is not intended to have any effect on correctly aligned preforms but is rather intended to act reliably only on the misaligned ones. The fingers of the star could, for example, engage in the intermediate spaces between preforms. According to another embodiment of the invention, however, it is especially advantageous for the rotating body to engage in the mouth openings of properly aligned preforms.

The rotating body could, for example, comprise its own independent drive. In this case, to prevent any interference with the flow of preforms, the rotation of the rotating body should be synchronized with the movement of the preforms. This can lead to serious problems especially when the flow of preforms is not continuous but rather stops and starts again or at least varies in speed. According to another embodiment of the invention, the rotating body is configured without an independent drive and thus projects into the path of movement of the preforms in such a way that the preform flow itself causes the rotating body to rotate. The need to synchronize the two types of movements is thus completely eliminated. The moving preforms drive the star by contact with its fingers, for example, thus causing it to rotate.

According to another advantageous embodiment of the invention, the alignment device is height-adjustable relative to the roller conveyor and in particular is configured to pivot vertically. It is thus possible to make adjustments to optimize the alignment result. The rotating body can comprise a certain spring-loaded vertical play.

The height-adjustability of the alignment device is also advantageous for the reason that, if a preform is in an unfavorable position, it is possible for it to become jammed. This pertains both to properly aligned and to misaligned preforms. This problem can be eliminated by means of a short stroke of the alignment device relative to the roller conveyor, so that the jammed preform can pass through. The relative stroke is preferably executed by the alignment device, which for this purpose comprises a lifting device, which, for example, can bring about a brief stroke and then allow the alignment device to return to its starting position. The stroke can be triggered, for example, upon detection by suitable measurement means that the preform flow has stopped or that the alignment device is no longer rotating.

The invention is explained in greater detail below on the basis of several exemplary embodiments, illustrated in the figures:

DETAILED DESCRIPTION OF THE INVENTION

Figure 1:
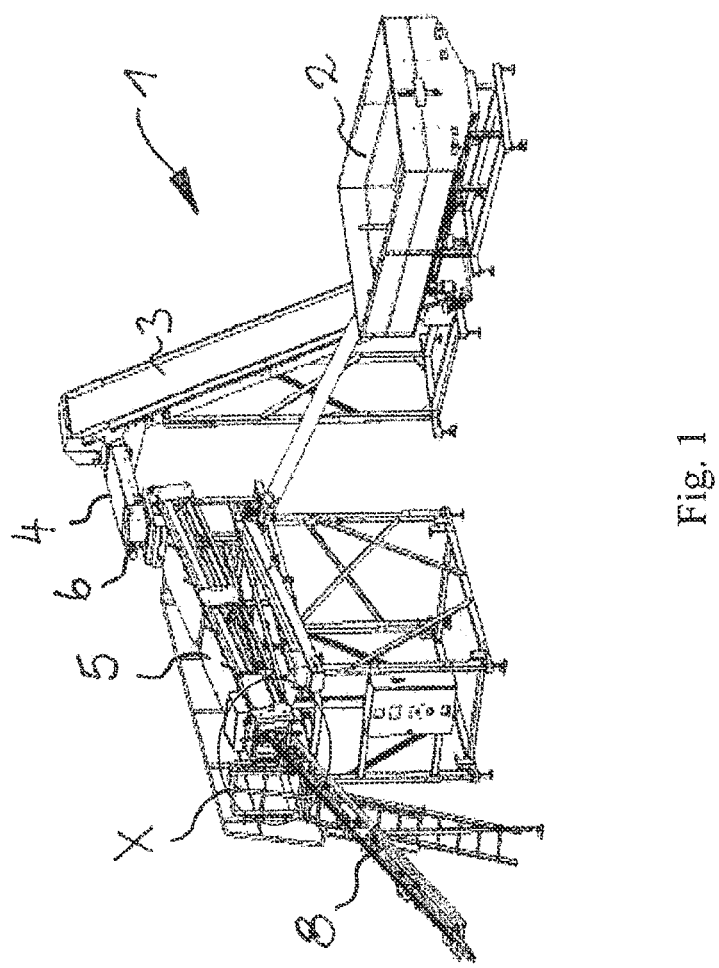
FIG. 1 shows a device for transporting preforms to a blow-molding machine for the production of containers of thermoplastic material.

FIG. 1 shows a device 1 for conveying preforms to, for example, a blow-molding machine for the production of PET bottles. The device consists of a collecting bin 2, in which a supply of preforms is provided. From the collecting bin 2, the preforms are conveyed by a vertical conveyor 3 to the inlet end of a conveying device 4. The other end of the conveying device 4, i.e., the discharge end, is arranged above a separator device 5, wherein a feed device 6 is provided in between to ensure the orderly transfer of the preforms from the conveying device 4 to the separator device 5 with a minimum of disruption. From the separator device 5, the preforms arrive, sorted, at a gravity conveying device 8, via which the preforms are conveyed into the blow-molding machine (not shown).

Figure 2:
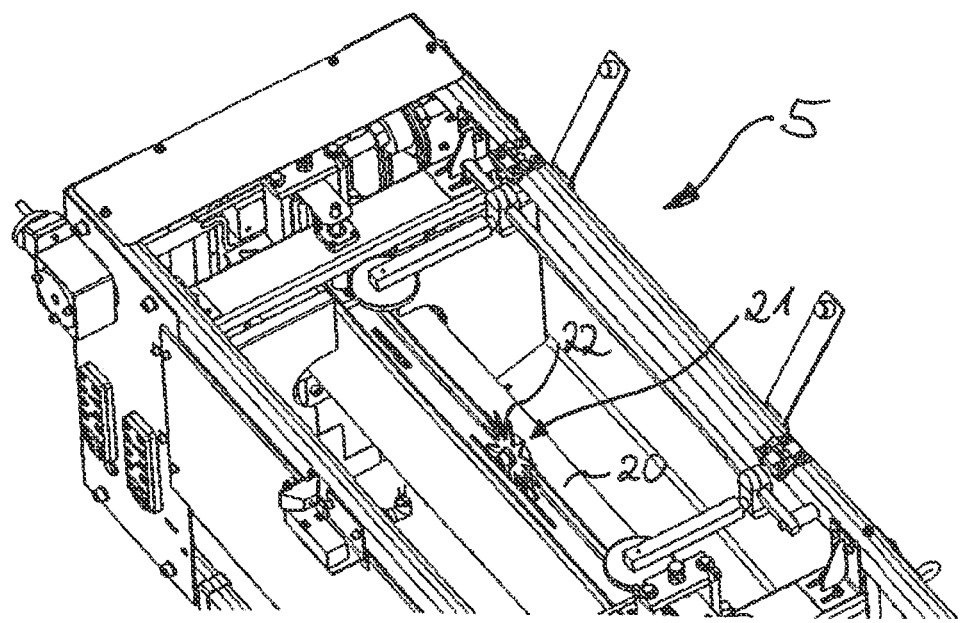
FIG. 2 shows a partial schematic top view of an exemplary embodiment of a separator device according to the invention with an alignment device.

FIG. 2 shows a partial top view of a separator device 5, wherein the separator device 5 is configured as a roller sorter with conveying rollers 20 rotating in opposite directions (wherein only one conveying roller is visible in the exemplary embodiment shown here, whereas the second conveying roller is covered by a hood), between which the preforms are transported in suspended fashion and with the proper alignment in a conveying direction X. Above the conveying rollers 20, an alignment device 21 with a star-shaped rotating body 22 is arranged.

Figure 3:
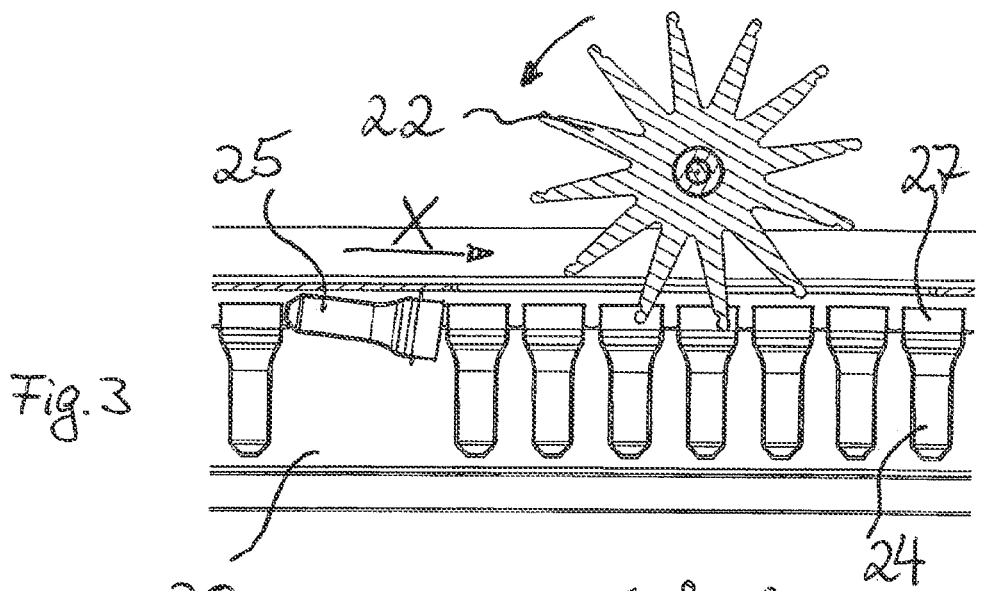
FIGS. 3-5 show an alignment process for a first misaligned preform.
Figure 4:
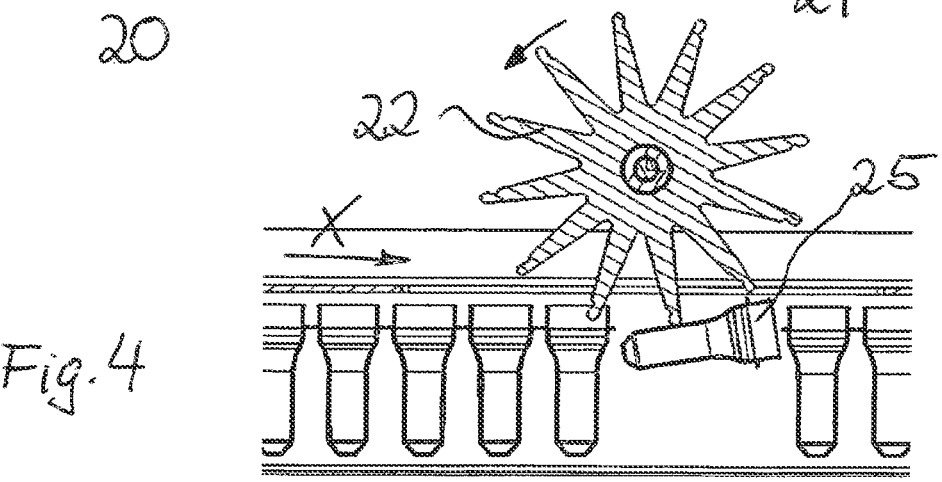
Figure 5:
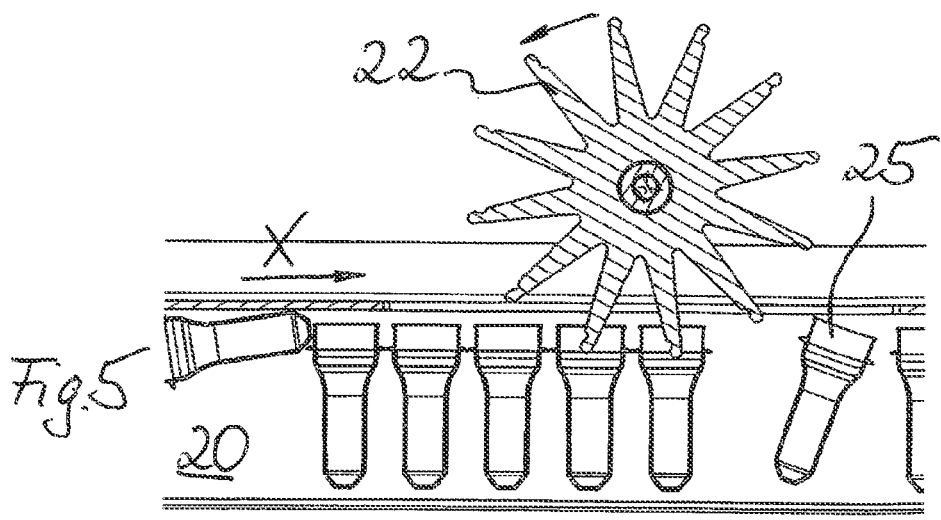

In FIGS. 3-5, preforms 24 supported in suspended fashion between the conveying rollers 20 are shown in the course of an alignment process for a misaligned preform 25 executed by the star-shaped rotating body 22 shown in FIG. 2. For this purpose, the rotating body 22 projects into the path of movement of the preforms 24.

At the beginning of the alignment process (FIG. 3), the fingers of the star-shaped rotating body 22 engage in the openings 27 of the suspended, aligned preforms. The preforms cause the star 22 to move, and the spacing between the free ends of the fingers is selected so that it corresponds to the distance between the centers of adjacent preforms. A suitable number fingers will be selected as a function of the radius of the star. As can also be seen in FIG. 3, one of the preforms 25 is misaligned; that is, it is not hanging, suspended between the conveying rollers, but rather is lying on top of the conveying rollers 20. It would not be possible to transfer it to the downline conveying device, and a disruption would be likely.

In FIG. 4, the misaligned preform 25, which by now has advanced in the movement direction X of the preform flow, has reached the rotating body 22. In contrast to the situation with the properly aligned preforms, the fingers of the star-shaped rotating body cannot engage in the opening 27 of the preform; instead, the fingers press against the side wall of the horizontal preform 25 and thus exert an aligning force on the misaligned preform 25. The preform 25 therefore becomes aligned in the desired hanging position shown in FIG. 5.

Figure 6:
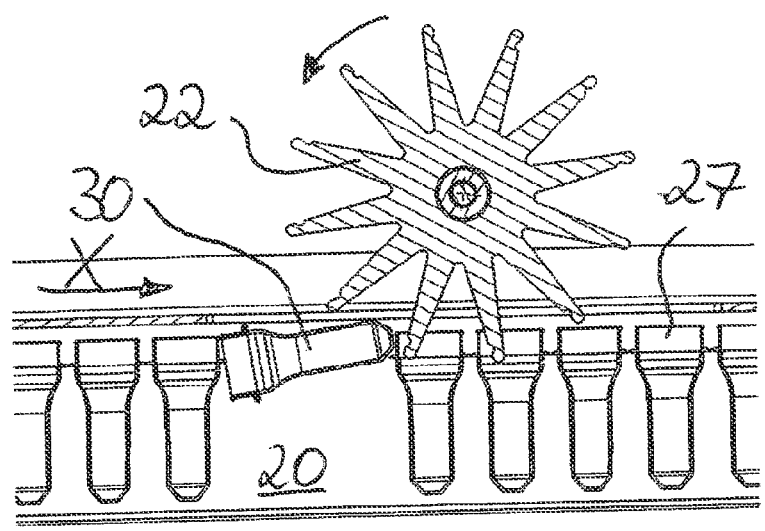
FIGS. 6-8 show an alignment process for a second misaligned preform.
Figure 7:
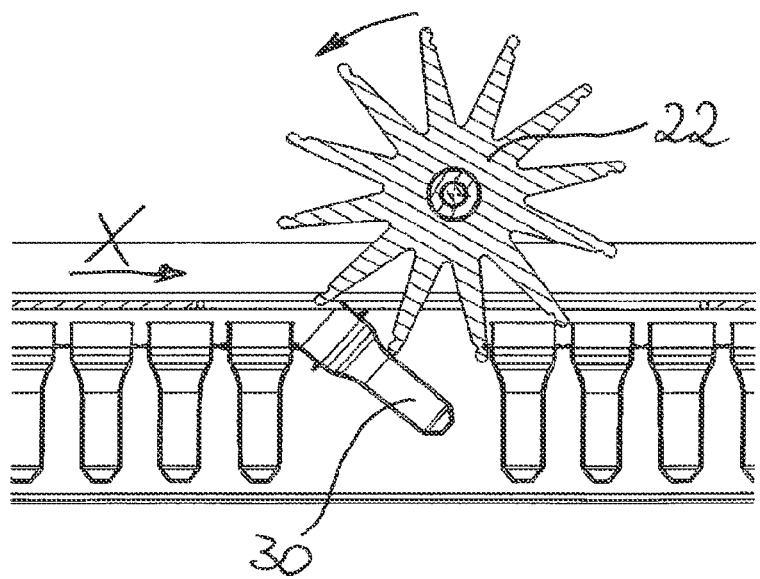
Figure 8:
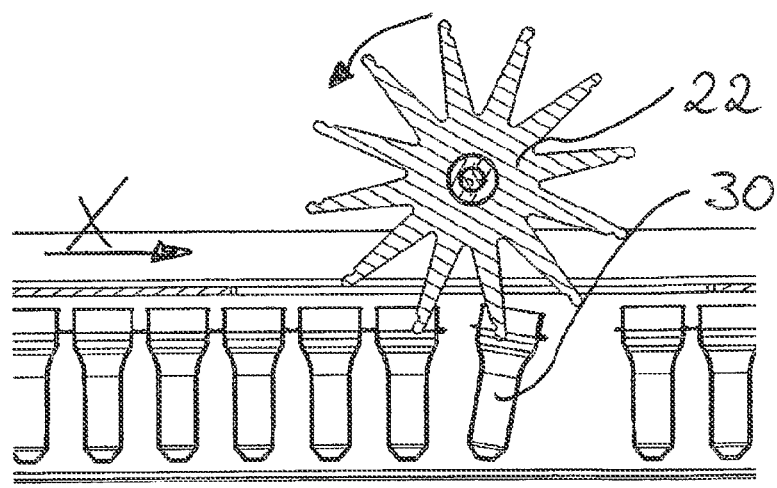

A similar, second alignment process is illustrated in FIG. 6-8, wherein the misaligned preform 30 in this example is aligned with its opening 27 facing away from the conveying direction X, in contrast to the example illustrated in FIGS. 3-5.

In this second example as well, the fingers of the star-shaped rotating body 22 engage in the openings 27 of suspended, aligned preforms 25 at the beginning of the alignment process (FIG. 6). In FIG. 7, the misaligned preform 30 has reached the rotating body 22, and again the fingers of the star-shaped rotating body 22 exert an aligning force on the misaligned preform 30, so that the preform 30 becomes aligned in the hanging position, as shown in FIG. 8.

Downstream from the alignment device 21 according to the invention, i.e., in the movement direction X, a kicker wheel or some other device for ejecting any preforms which may still be misaligned can be provided, as discussed above as belonging to the prior art.

Figure 9:
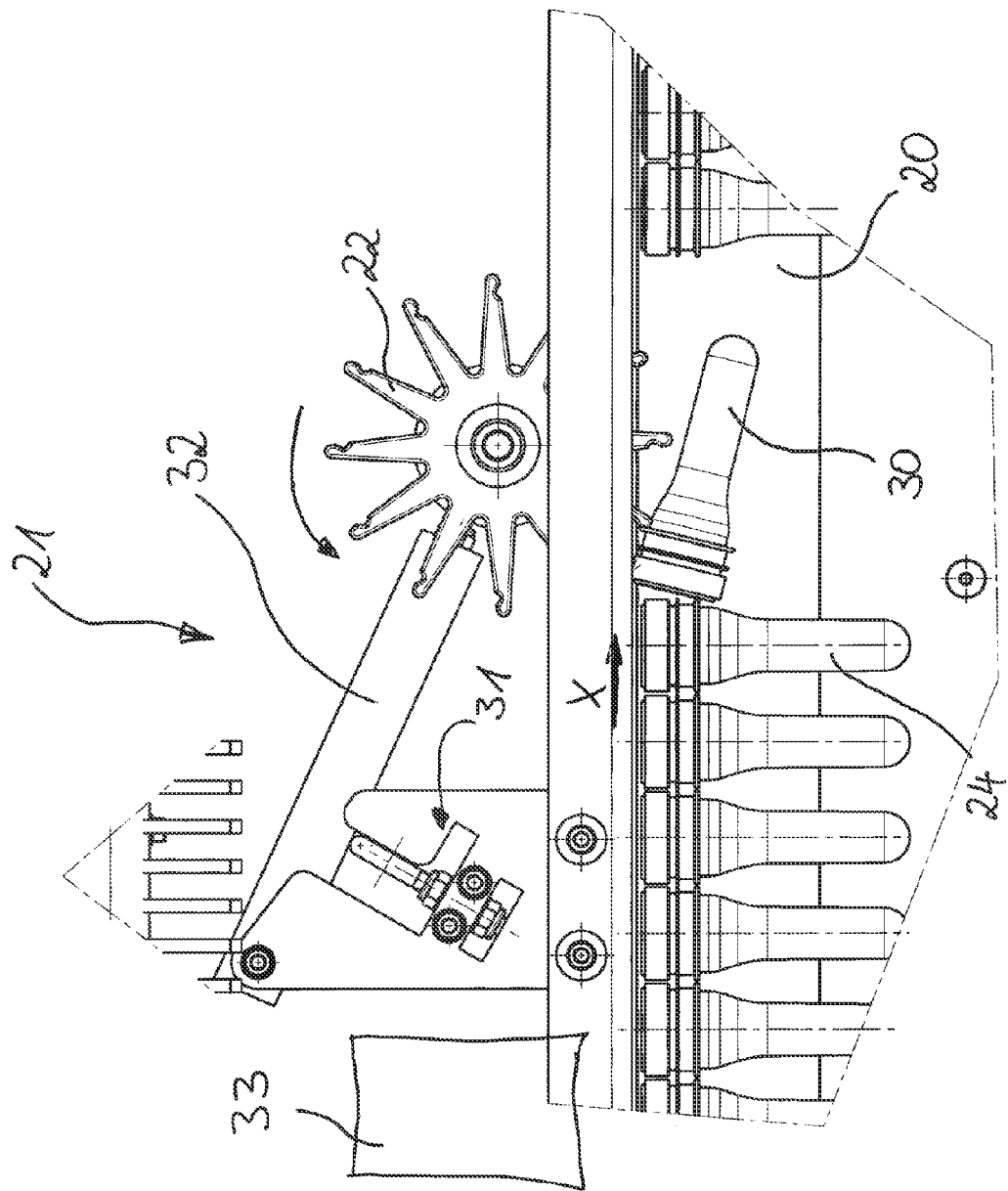
FIGS. 9 and 10 show views of a jammed preform before and after a stroking movement of the alignment device.
Figure 10:
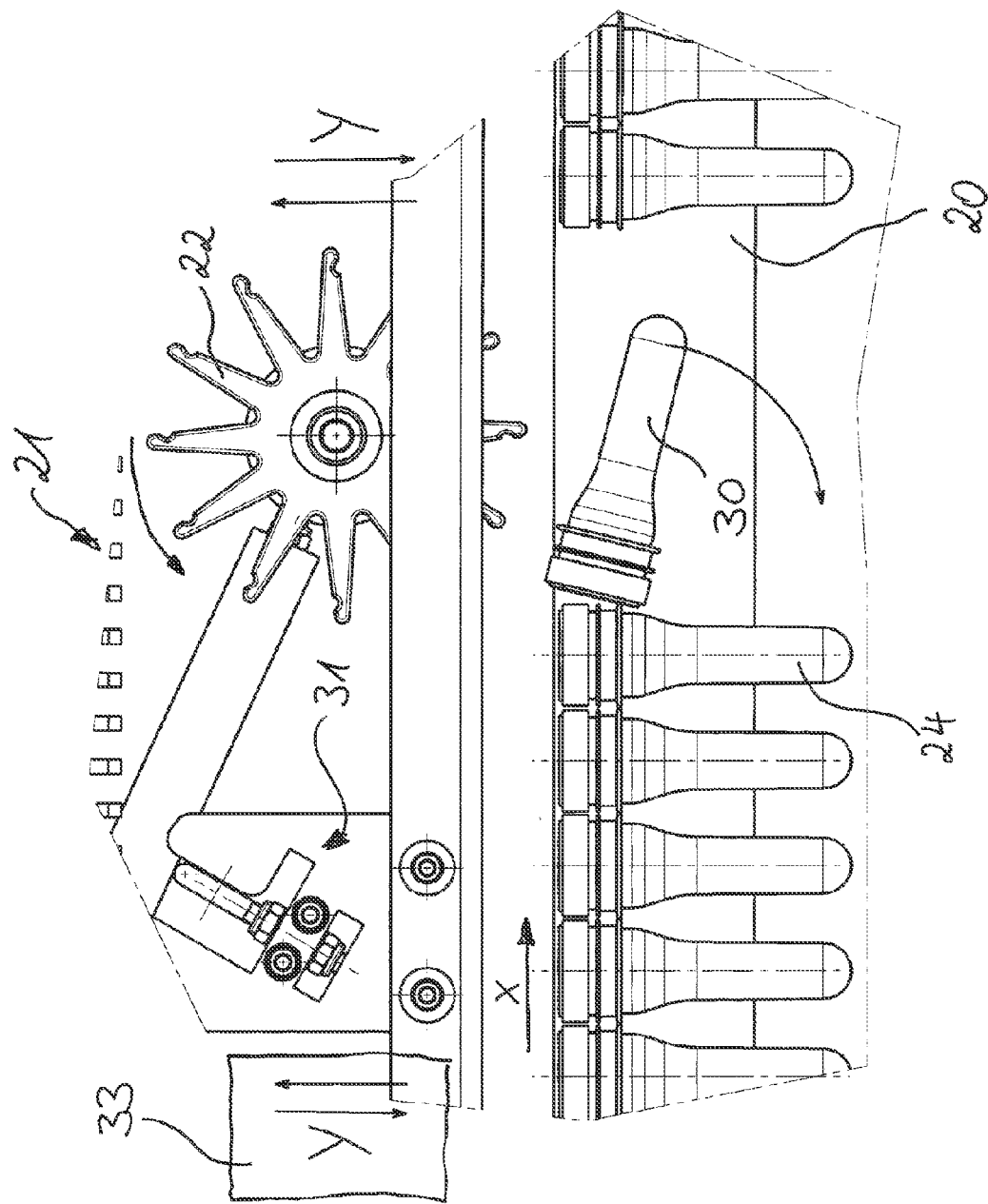

Under unfavorable conditions, it can happen that the rotating body 22 contacts a preform in such a way that the preform becomes jammed. This situation is shown in FIGS. 9 and 10. The preform 30 is contacted by the fingers of the rotating body 22 in FIG. 9. The aligning force exerted by the fingers can in the present case can not, as planned, lead to the proper alignment of the misaligned preform 30; instead, the preform 30 is merely pressed against the rotating rollers 20 of the roller sorter 5. This leads to an interruption in the flow of preforms and a backup.

To eliminate this backup, the rotating body 22 can be raised relative to the conveying rollers 20. A lifting device 33 makes possible a relative stroke in the Y direction between the roller conveyor 22 and the alignment device 21, so that the fingers of the rotating body 22 release the preform 30, allowing it to travel onward. Because the preform 30 can now move freely, and since in particular there are no longer any preforms 24 adjacent to it, it can be sorted between the rotating rollers 20 and slide further along behind the previously sorted preforms.

It can also be seen in FIGS. 9 and 10 that the rotating body 22 is mounted rotatably on a pivot arm 32. The angle of the pivot arm can be adjusted, and thus the arm can be positioned in the vertical direction. This positioning is carried out by means of an actuating device 31.

The invention claimed is:

1. A separator device for preforms, comprising: an alignment device for dealing with misaligned preforms; and a roller sorter with two conveying rollers rotating in opposite directions and between which the preforms are transported in a conveying direction while suspended with a proper alignment, wherein the alignment device comprises a rotating body supported rotatably around an axis, the rotating body being arranged above the roller sorter so that the rotating body projects into a path of movement of misaligned preforms, wherein the rotating body is configured to exert an aligning force on the misaligned preforms that are not suspended in the proper alignment between the conveying rollers, wherein the rotating body also projects into a path of movement of preforms that are suspended in the proper alignment between the conveying rollers and is configured and arranged so as to exert an aligning force only on the misaligned preforms.

2. The separator device according to claim 1, wherein the rotating body has a star-shaped configuration with radially outward projecting fingers that extend into the path of movement of the preforms.

3. The separator device according to claim 2, wherein the fingers are arranged around a circumference of the rotating body in a spaced manner, wherein a distance between free ends of adjacent fingers at the outer circumference corresponds essentially to a distance between centers of two abutting preforms suspended with the proper alignment between the conveying rollers.

4. The separator device according to claim 1, wherein the rotating body is configured to engage centrally between the two conveying rollers in the path of movement of the preforms.

5. The separator device according to claim 1, wherein the rotational axis of the rotating body is parallel to a plane defined by rotational axes of the conveying rollers.

6. The separator device according to claim 1, wherein the rotating body engages in a mouth opening of properly aligned preforms.

7. The separator device according to claim 1, wherein the rotating body is configured without an independent drive and projects into the path of movement of the preforms so that the flow of preforms causes the rotating body to rotate.

8. The separator device according to claim 1, wherein the alignment device is height-adjustable relative to the roller conveyer.

9. The separator device according to claim 1, wherein the alignment device is pivotable in a vertical direction.

10. The separator device according to claim 1, wherein the rotating body is spring-loaded to have vertical play.

11. The separator device according to claim 1, wherein the alignment device has a lifting device for executing a relative stroke between the rotating body and the conveying rollers.

\* \* \* \* \*